(12) United States Patent
Melberg et al.

(10) Patent No.: US 6,854,921 B2
(45) Date of Patent: Feb. 15, 2005

(54) BALLISTIC RESISTANT CAP NUT

(75) Inventors: David S. Melberg, Everett, WA (US); James J. Kunda, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 10/313,664

(22) Filed: Dec. 6, 2002

(65) Prior Publication Data

US 2004/0009037 A1 Jan. 15, 2004

Related U.S. Application Data

(60) Provisional application No. 60/394,839, filed on Jul. 10, 2002.

(51) Int. Cl.$^7$ .......................... F41H 5/013; B60R 21/12
(52) U.S. Cl. ...................... 403/408.1; 403/11; 403/22; 403/24; 109/49.5; 109/51; 411/399; 411/402; 411/427
(58) Field of Search ............... 403/408.1, 22, 403/24, 11; 109/49.5, 51; 411/399, 402, 405, 427

(56) References Cited

U.S. PATENT DOCUMENTS

| | | | | |
|---|---|---|---|---|
| 434,503 A | * | 8/1890 | Corry | 403/22 |
| 2,391,232 A | * | 12/1945 | Farrell et al. | 411/399 |
| 3,434,521 A | * | 3/1969 | Flora | 411/180 |
| 4,033,243 A | * | 7/1977 | Kirrish et al. | 411/338 |
| 5,244,326 A | * | 9/1993 | Henriksen | 411/180 |
| 5,253,966 A | * | 10/1993 | Clemens et al. | 411/399 |
| 5,290,131 A | * | 3/1994 | Henriksen | 411/180 |
| 5,438,908 A | | 8/1995 | Madden, Jr. | |
| 5,600,084 A | | 2/1997 | Gonzalez | |
| 6,027,071 A | * | 2/2000 | Lair | 411/399 |
| 6,041,689 A | | 3/2000 | Lair et al. | |
| 6,047,626 A | | 4/2000 | Lair et al. | |
| 6,126,355 A | * | 10/2000 | Clover, Jr. | 403/22 |

FOREIGN PATENT DOCUMENTS

FR        1076611 A1  * 10/1954

* cited by examiner

*Primary Examiner*—Daniel P. Stodola
*Assistant Examiner*—Ernesto Garcia
(74) *Attorney, Agent, or Firm*—Harness Dickey & Pierce P.L.C.

(57) ABSTRACT

A self locking fastener system is disclosed for light-weight ballistic resistant applications. The fastener system includes a ballistic resistant cap nut with an integral shoulder. The shoulder is formed onto the mating surface of the cap nut and is keyed to lock with a cut-out in a structural member to which the fastener system is secured. In a commercial aircraft, the cap nut is located on the passenger cabin side of the ballistic resistant flight deck door and prevents tampering therewith that might otherwise lead to disassembly or damage to the fastener system and degrade the ballistic resistance of the door assembly. Thus provided, the fastener system is resistant to removal by manipulation of the cap nut as well as damage from ballistic projectiles. The shoulder of the cap nut increases the shear area of the fastener along the plane of the mating surface thereby enhancing the fastener's resistance to shear loading. The cap nut is constructed of titanium or stainless steel.

12 Claims, 3 Drawing Sheets

BALLISTIC RESISTANT CAP NUT

CROSS-REFERENCE TO RELATED APPLICATIONS

This application claims the benefit of priority of U.S. Provisional Application Ser. No. 60/394,839 filed Jul. 10, 2002. The disclosure of the above application is incorporated herein by reference in its entirety.

FIELD OF THE INVENTION

The present invention relates to a ballistic resistant cap nut used in a fastener system for use in securing ballistic resistant panels and doors to frame members within an aircraft.

BACKGROUND OF THE INVENTION

The Federal Aviation Administration has issued requirements that flight decks of commercial aircraft meet new ballistic and intrusion criteria. Interior components such as flight deck doors and panels have been reinforced with ballistic resistant materials to comply with these mandated requirements. In aircraft design, factors such as pay-load capacity, fuel economy and safety are important considerations. Therefore, materials are generally selected that provide a high strength-to-weight ratio.

A typical fastener for ballistic proof and armored panels is disclosed in U.S. Pat. No. 5,438,908. Some ballistic proof panels have specialized fasteners as disclosed in U.S. Pat. No. 5,600,084. Many of these fasteners were not designed to be tamper proof and may be heavier than need be. While these fasteners may be adequate for their applications, fasteners for flight deck doors of a commercial passenger aircraft require a high strength-to-weight ratio, and also that they should not be able to be disassembled from the passenger cabin side of flight deck door. Therefore, the need exists for a locking fastener system for ballistic resistant panels and doors for commercial passenger aircraft applications that compliments the resistance capabilities of the ballistic panels, and which further cannot be disassembled from the passenger compartment side of the flight deck door.

SUMMARY OF THE INVENTION

The present invention is directed to a ballistic resistant cap nut used in a fastener system for securing together ballistic resistant doors and panels in an aircraft. As will be described, the fastener system generally comprises a cap nut and bolt or screw, where the cap nut is arranged on the passenger cabin side of a flight deck door. The cap nut is of sufficient thickness to meet the FAA ballistic criteria. In one preferred form, the ballistic resistant cap nut comprises an outside surface that allows the nut to be held while tightening. In another preferred form, the present invention provides a ballistic resistant cap nut with a shoulder on its mating face that contacts a surface of a mounting panel to which the ballistic resistant cap nut is secured. The shoulder, when in contact with the surface of the mounting panel, inhibits rotation of the cap nut when the fastener element is fully installed. The shoulder thus provides a tamper proof feature to the ballistic resistant cap nut so that an individual on the passenger cabin side of the door cannot tamper with the fastener system.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5b is a side view of the ballistic resistant cap nut of FIG. 5a;

FIG. 6b is a side view of the ballistic resistant cap nut of FIG. 6a.

DETAILED DESCRIPTION OF THE PREFERRED EMBODIMENTS

The following description of the preferred embodiments is merely exemplary in nature and is in no way intended to limit the invention, its application, or uses.

Figure 1:
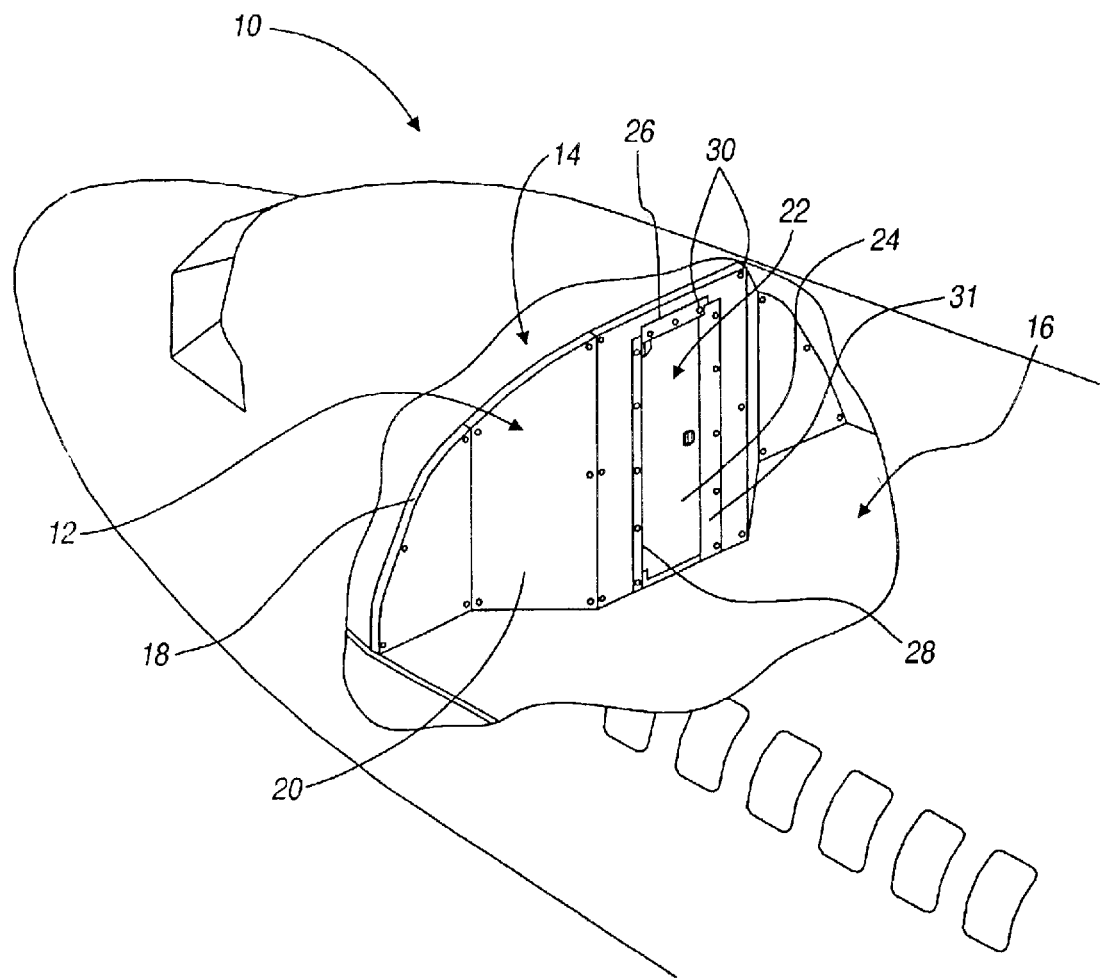
FIG. 1 is a partial cut away perspective view of an aircraft showing a flight deck door assembly using a plurality of cap nut fastener systems in accordance with the present invention.

With reference to FIG. 1, an exemplary aircraft is generally indicated by reference numeral 10. The aircraft 10 includes a flight deck bulkhead 12 that separates a flight deck 14 from the passenger cabin 16. Flight deck bulkhead 12 includes a frame 18, panels 20, armor 31 and a door assembly 22 that are assembled to provide a barrier between the flight deck 14 and passenger cabin 16. Door assembly 22 includes a door 24, interconnected to a door frame 26 via a door hinge 28, for allowing control over access to the flight deck 14.

For ballistic and intrusion resistant applications, door assembly 22 and panel 20 may be strengthened with ballistic resistant materials. Generally, panel 20 and door frame 26 are overlapped by armor 31 to improve ballistic and intrusion resistance for flight deck bulkhead 12 and door assembly 22. A plurality of ballistic resistant fastener systems 30, each formed in accordance with a preferred embodiment of the present invention, are used to secure panel 20, door frame 26 and armor 31 together.

Figure 2:
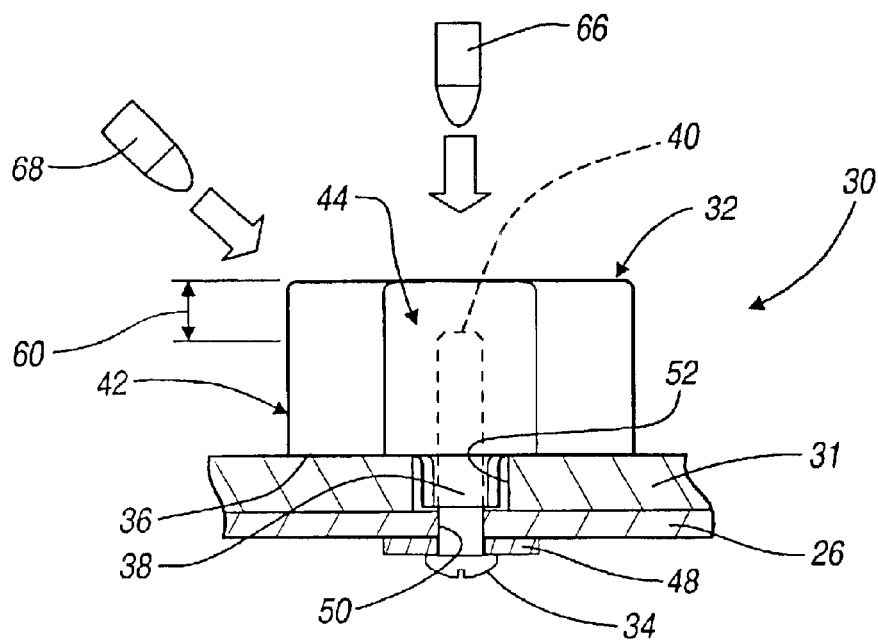
FIG. 2 is a side view of an assembled ballistic resistant fastener system utilizing the ballistic resistant cap nut in accordance with a preferred embodiment of the present invention.

With reference to FIG. 2, a preferred embodiment of one of the ballistic resistant fastener systems 30 using the ballistic cap nut 32 of the present invention is shown in greater detail. The fastener system 30 includes a cap nut 32 and a bolt or other like fastening element 34. The cap nut 32 has an integrally formed planar mating surface 36 having a shoulder portion 38. A threaded aperture 40 is shown in FIG. 2 to extend into the cap nut 32 and through shoulder portion 38. An outer surface 42 in part defines the exterior of cap nut 32. A torque surface 44 is adapted for allowing cap nut 32 to be held during installation. Shoulder portion 38 preferably includes a locking surface 46 as discussed in more detail below. An optional washer 48 (shown in cross section) can be provided with fastening element 34. Preferably, cap nut 32 is constructed of titanium, steel, or stainless steel, and more preferably from 15-5 PH stainless steel, but other suitable, ballistic resistant materials could also be used. Cap nut 32 can be readily machined into the preferred embodiment by those skilled in such practices.

Figure 3:
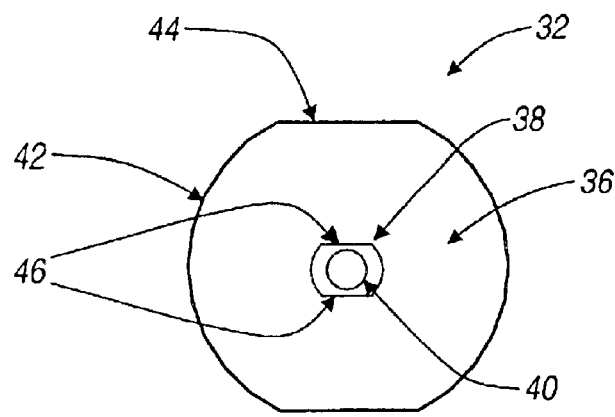
FIG. 3 is a view of the mating surface of the ballistic resistant cap nut of FIG. 2.

With brief reference to FIG. 3, the mating surface 36 of cap nut 32 with integral shoulder portion 38 is shown. Shoulder portion 38 is shown in a preferred embodiment to include locking surfaces 46 in the form of flat portions. An outer surface 42 in part defines the exterior of cap nut 32. A torque surface 44 is adapted for allowing cap nut 32 to be held during installation.

Fastener system 30 is shown in FIG. 2 in a preferred embodiment wherein a door frame 26 and armor 31 (shown in cross section for clarity) are secured together. Doorframe 26 has a mounting aperture 50 formed therein. Armor 31 includes a cut-out 52 shaped in accordance with the shoulder portion 38. During assembly, armor 31 and door frame 26 are positioned such that the mounting aperture 50 and the cut-out 52 are aligned. Fastening element 34 extends through mounting aperture 50 and cut-out 52, and cap nut 32 is secured thereto. A thread locking material may be introduced into the interface between the fastening element 34 and the threaded aperture 40 to further secure the fastening element 34 to the cap nut 32.

Figure 4:
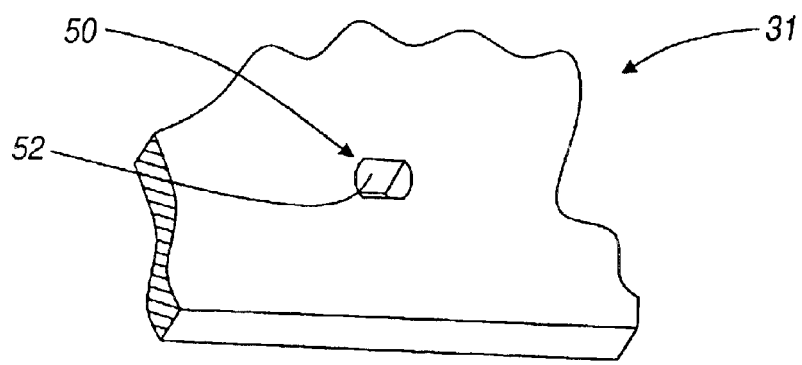
FIG. 4 is a perspective view of a cutout of a mounting panel showing a locking aperture used with the cap nut of the present invention.

With reference to FIG. 4, a portion of armor 31 is shown. Cut-out 52 extends through the entire thickness of armor 31. Since the shoulder portion 38 has a generally identical cross section shape as the cut-out 52, this enables the shoulder portion 38 to snugly fit within the cut-out 52. This prevents shoulder portion 38 from rotating within the cut-out 52. Cap nut 32 is located on the passenger cabin 16 side of flight deck bulkhead 12. When fastening element 34 and cap nut 32 are fully engaged, cap nut 32 cannot be rotated without deformation of either cap nut 32 or cut-out 52. As will be appreciated, other adaptations of cap nut 32 and shoulder portion 38 can be provided to accomplish this inter-locking lock feature.

With continued reference to FIG. 2, an optional washer 48 can be provided with fastening element 34. In one preferred form, the cap nut 32 has a minimum cap thickness above the threaded aperture 40, designated by dimensional arrow 60, of about 0.19 inch–0.20 inch (4.8 mm–5.1 mm). Cap thickness 60 is sufficient to withstand an impact from a projectile 68 impacting cap nut 32 at an angle (i.e., not perfectly perpendicular to any outer surface of the cap nut 32), as well as a projectile 66 impacting the top surface directly above the fastening element 34. Shoulder portion 38 resists shearing of fastening element 34 in the event that the cap nut 32 is struck from an angle such as by projectile 68.

Figure 5A:
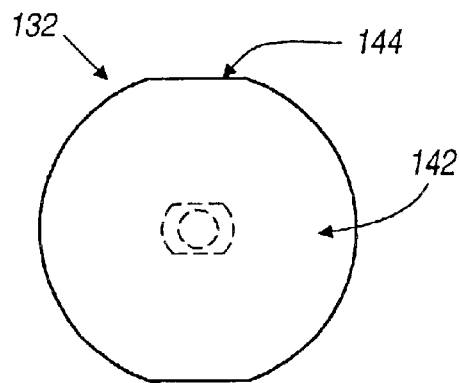
FIG. 5a is a plan view of the outer surface of an alternate preferred embodiment of the ballistic resistant cap nut of the present invention.
Figure 6A:
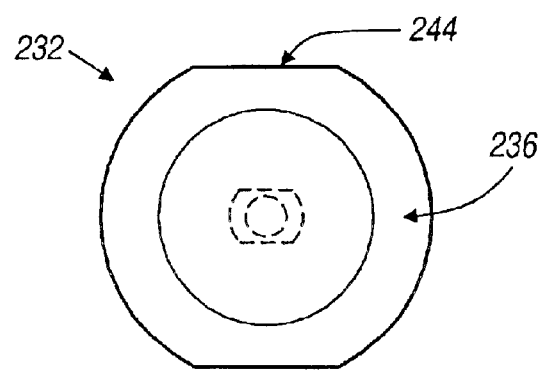
FIG. 6a is a plan view of the outer surface of an alternate preferred embodiment of the ballistic resistant cap nut of the present invention.
Figure 5B:
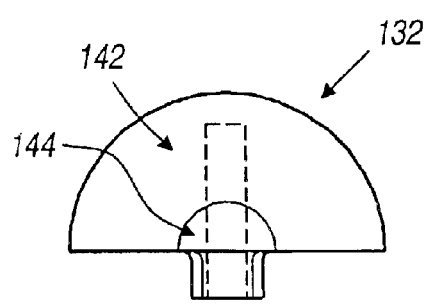
Figure 6B:
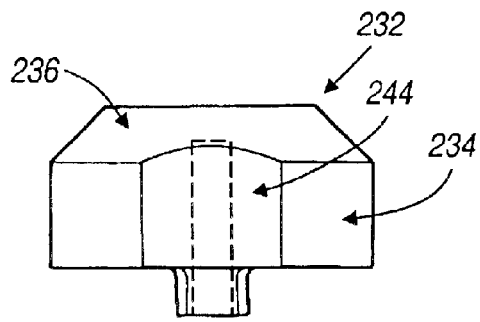

FIGS. 5a and 5b show an alternate preferred embodiment in the form of the cap nut 32 that forms a dome nut 132. Dome nut 132 has an outer surface 142 that is hemispherical and a torque surface 144. FIGS. 6a and 6b show another alternate preferred embodiment of the cap nut 32 in the form of a chamfered nut 232. Chamfered nut 232 has an outer surface 234 that is generally cylindrical with a beveled edge 236 and a torque surface 244.

The present invention thus provides a lightweight, tamper proof fastener system for use in applications that require ballistic and intrusion resistance. While it is especially well adapted for use with aircraft, it will be appreciated that the fastener system of the present invention is readily adapted for use with little or no modification in virtually any form of mobile platform where security and ballistic resistance are important considerations. The fastener system of the present invention is further not limited to use with only mobile platforms, but may also be implemented in virtually any stationary structure where ballistic resistance is a concern.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tamper and ballistic resistant fastener system comprising:
    a fastening element;
    a cap nut, said cap nut adapted to be secured to the fastening element to thereby secure an exterior member therebetween, the cap nut having a mating surface and an outer surface;
    an aperture formed within said cap nut, to open onto said mating surface, said aperture adapted to receive said fastening element so as to secure said fastening element to said cap nut; and
    a shoulder portion, formed on said mating surface, having a non-circular shape in accordance with a shape of a locking cut-out formed in a flight deck wall facing a passenger cabin area, said shoulder portion further adapted to bindingly engage said locking cut-out a so as to prevent rotation therebetween.

2. The ballistic resistant fastener system of claim 1, wherein said cap nut is generally cylindrical in shape.

3. The ballistic resistant fastener system of claim 1, further comprising a torque surface on said outer surface of said cap nut, said torque surface adapted for engaging a tool to inhibit rotation of said cap nut relative to said fastening element during installation of said fastener system.

4. The ballistic resistant fastener system of claim 1, wherein said cap nut is constructed of titanium.

5. The ballistic resistant fastener system of claim 1, wherein said cap nut is constructed of 15-5 PH stainless steel.

6. The ballistic resistant fastener system of claim 1, further comprising a contoured surface on said shoulder portion, said contoured surface adapted to be received within said locking cut-out of said flight deck wall said contoured surface further adapted to engage said flight deck wall to inhibit rotation of said ballistic resistant cap nut.

7. The ballistic resistant fastener system of claim 1, wherein said aperture extends through said shoulder portion.

8. The ballistic resistant fastener system of claim 1, wherein said cap nut is generally hemi-spherical in shape.

9. A ballistic resistant and tamper proof fastener assembly adapted for use on a flight deck wall, wherein the flight deck wall demarcates a flight deck area and a passenger cabin area, the fastener assembly comprising:
    a threaded fastening element;
    a fastening cap nut having a threaded bore and a shoulder portion, said shoulder portion having a non-circular shape in accordance with a shape of a locking cut-out formed in said flight deck wall that faces said passenger cabin area, said flight deck wall further including an aperture opening onto a side of said flight deck wall that faces said flight deck area, said aperture being generally coaxially aligned with said locking cut-out;
    said fastening cap nut further being formed from a ballistic resistant material; and
    wherein said shoulder portion of said fastening cap nut fits within said locking cut-out when said fastening cap nut is secured to said flight deck wall by said threaded fastening element, thereby preventing tampering with said fastener assembly by an individual positioned in said passenger cabin area.

10. The fastener assembly of claim 9, wherein said fastening cap nut is comprised of stainless steel.

11. The fastener assembly of claim 10, wherein said fastening cap nut is comprised of 15-5 PH stainless steel.

12. The fastener assembly of claim 9, wherein said fastening cap nut is comprised of titanium.

* * * * *